United States Patent [19]

Steiner

[11] Patent Number: 4,672,916
[45] Date of Patent: Jun. 16, 1987

[54] BELT FEEDER APPARATUS WITH A ROTARY DIVERTER ASSEMBLY

[75] Inventor: Glenn M. Steiner, Orrville, Ohio
[73] Assignee: Sevenson Company, Orrville, Ohio
[21] Appl. No.: 614,062
[22] Filed: May 25, 1984
[51] Int. Cl.⁴ .............................................. A01K 5/00
[52] U.S. Cl. .................................. 119/52 B; 198/367
[58] Field of Search ..................... 119/52 B, 52 AF; 198/364, 367

[56] References Cited

U.S. PATENT DOCUMENTS 3,672,334  6/1972  Scheppele ...................... 119/52 B
3,902,592  9/1975  Buschbom et al. ........... 119/52 B X
4,213,525  7/1980  Scheppele ...................... 198/367 X Primary Examiner—Robert P. Swiatek
Attorney, Agent, or Firm—Mack D. Cook, II

[57] ABSTRACT

A delivery apparatus for livestock feed having an endless belt carrying the feed from a supply source toward feeding positions on either side of the belt. The apparatus further has a carriage framework movable back and forth over the belt, a drive mechanism for selectively moving the carriage along the belt toward the supply source, and a rotatable diverter assembly mounted on the carriage for selectively discharging the feed on the belt toward the feeding positions.

2 Claims, 4 Drawing Figures

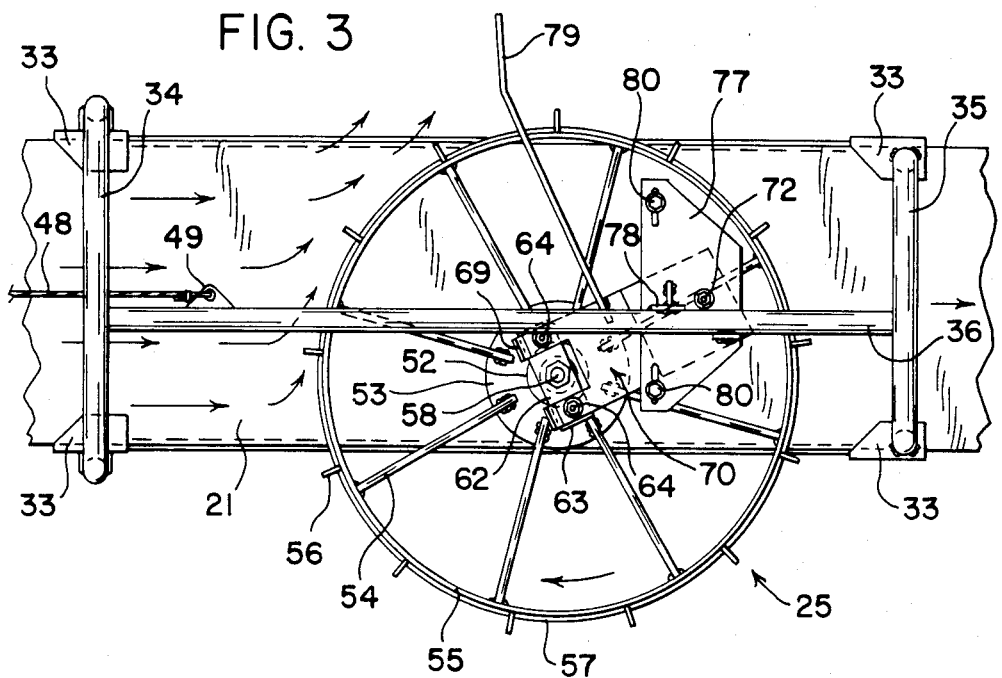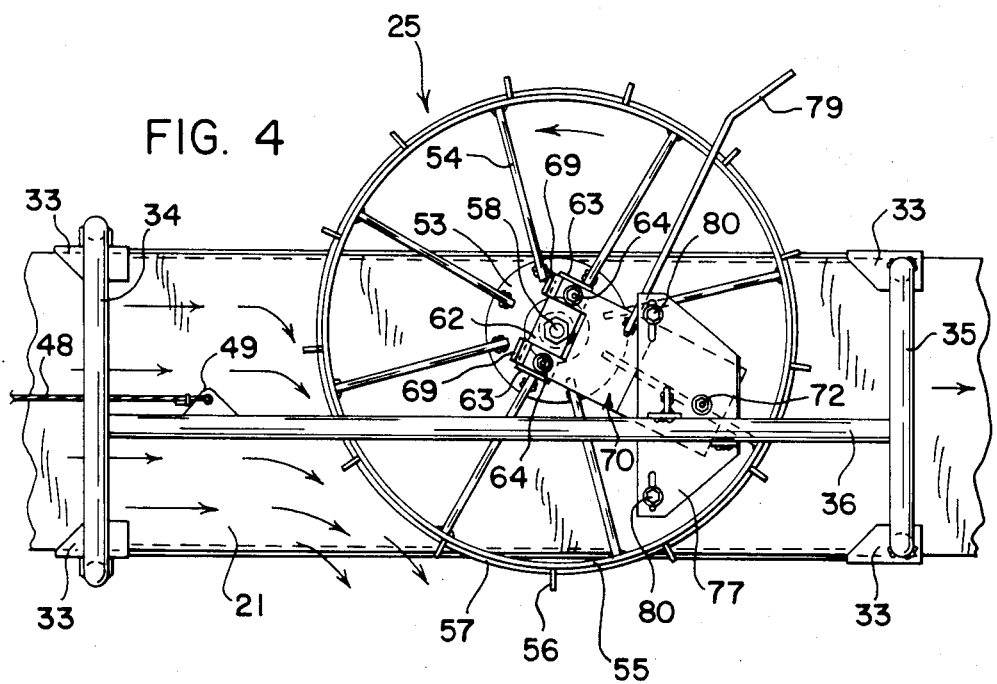

BELT FEEDER APPARATUS WITH A ROTARY DIVERTER ASSEMBLY

BACKGROUND OF THE INVENTION

This invention relates to a feed delivery apparatus for use wherever livestock is cared for and fed. A farmer has an obligation every day of the year to deliver mixed feed for animal consumption. There are also many other daily chores to which to attend. The "feed time" chore must be handled in the shortest possible time at the lowest possible cost, using inexpensive and easily maintained equipment and wasting little of the mixed feed.

The most recent prior art known to the inventor and relevant to a feed delivery apparatus according to the invention is U.S. Pat. No. 4,213,525, 7/1980, Scheppele, from U.S. Class 198/364. The Scheppele disclosure shows a plow 76 and a deflector 78 designed to extend completely across the endless belt 12 in each of two oblique positions. Scheppele also discusses the disadvantages of three earlier prior art patents which used only a shiftable plow or diverter. Also relevant is U.S. Pat. No. 3,759,227, 9/1973, Wolfe et al, disclosing a tranversely movable sweep member passing laterally across the belt.

SUMMARY OF THE INVENTION

The object of the invention is to provide an easy to install, but readily movable, efficient, inexpensive to acquire and to operate, and easy to maintain feed delivery apparatus; an apparatus comprising a combination of but a few elements for use wherever valuable animals are cared for and fed; and in the largest projected market, wherever dairy cows are milked.

The present invention was conceived to compete with state-of-the art feed delivery apparatus according to the concepts of inventors, such as Scheppele. The farm equipment market, in particular, is particularly sensitive to escalation in equipment acquisition costs. The intention of the inventor is to provide for the farmer a better feed delivery apparatus at a lower cost relative to the existing products.

These and other objects of the invention, as well as the operating efficiencies and advantages thereof, will be apparent in view of the following drawings and specification.

According to the invention, a delivery apparatus for livestock feed has a conventional endless belt driven by a conventional drive means for carrying the feed away from a supply source toward feeding positions at the side of the belt. The apparatus also has a carriage movable along a substantial portion of the length of the belt. The carriage has stanchion members projecting upwardly above the belt and interconnected by a central member. The carriage framework is connected to a drive means, for selectively moving the carriage along the belt toward, but not necessarily away from, the supply source.

A basic component of the feed delivery apparatus is a rotary diverter assembly suspended from the carriage framework central member and maintained in pressure contact with the moving belt for discharging feed thereon to a side thereof.

In general, the rotary diverter assembly comprises a hub member having an upwardly directed axle shaft and adapted for carrying an annular ring in contact with the moving belt, an articulated axle shaft mounting member extended laterally from a carriage framework central member, and means to position the axle shaft mounting member with the annular ring lower edge in pressure contact with one side of the moving belt.

In the preferred embodiment, the hub member carries a rigid annular ring with a series of radially outwardly directed feed paddles thereon. Below the feed paddles, the rigid ring carries a resilient annular ring for frictional engagement with the upper surface of the moving belt.

THE DRAWINGS

FIG. 3 is a top view of a rotary diverter assembly shifted or positioned for feed delivery to one side, the left side in FIG. 1, of the moving belt; and FIG. 4 is another top view of a rotary diverter assembly shifted or positioned for feed delivery to the other side, the right side in FIG. 1, of the moving belt.

DETAILED DESCRIPTION OF THE INVENTION

Figure 1:
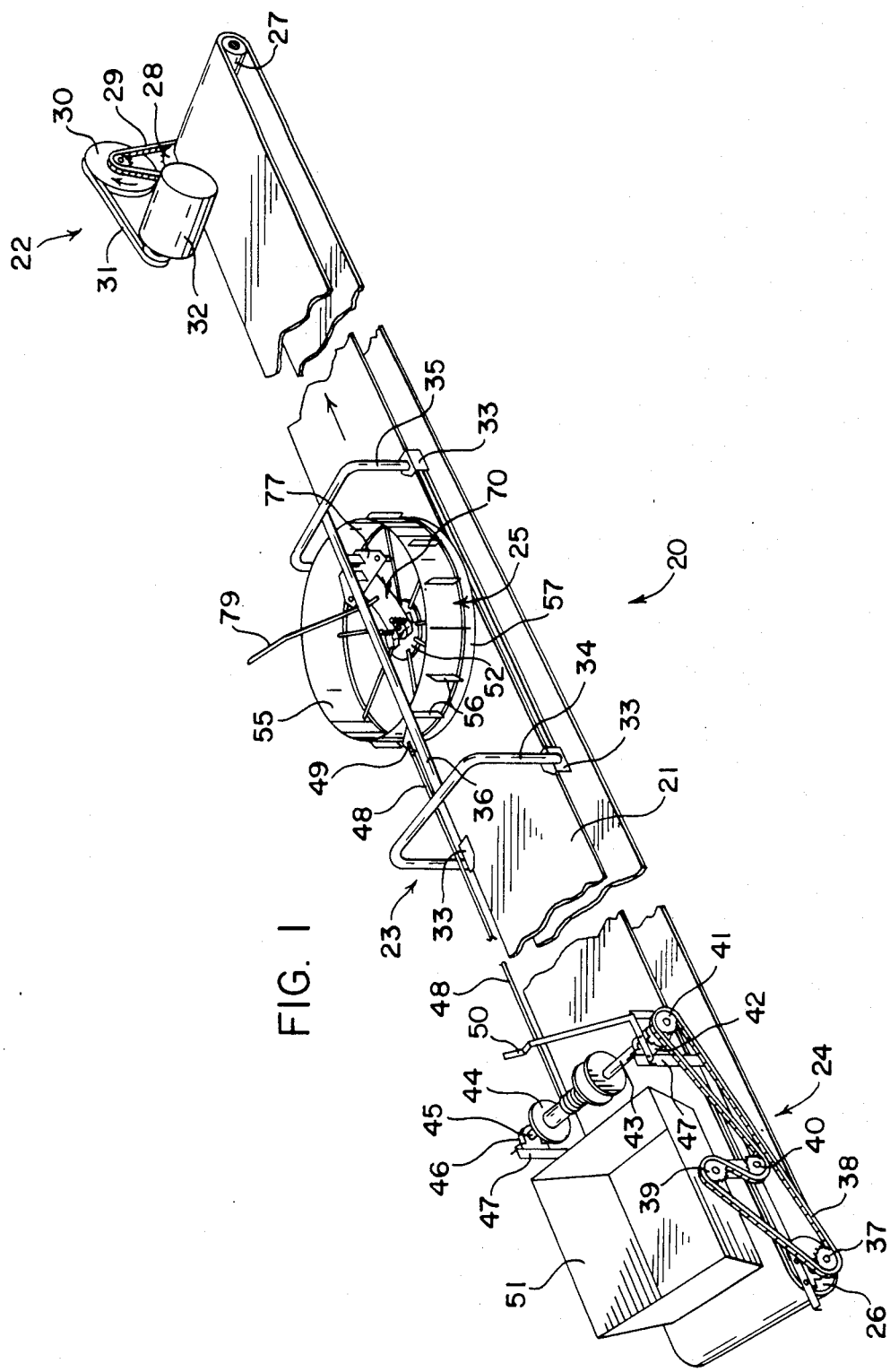
FIG. 1 is a perspective view of a feed delivery apparatus according to the invention.

A feed delivery apparatus according to the invention is referred generally by the numeral 20 and has five primary and basic components. A frame mounted conventional endless belt 21 positioned by the user, as required, along the animal feeding positions. A drive means 22 powering the endless belt 21. A carriage 23 movable along the belt 21. A second drive means 24, preferably powered-off the belt drive means 22, for selectively moving the carriage 23 toward a feed source. And, a rotary diverter assembly 25.

The belt 21 and drive means 22

The endless belt 21 is conventional and runs around a head roll 26 and a tail roll 27. The rolls 26 and 27 are conventionally mounted on a floor supported structural frame (not shown). The tail roll 27 carries a sprocket 28 driven by a chain 29 engaging the hub of a pulley 30 connected by a V-belt 31 driven by a suitable electric motor 32. The upper run of the belt 21 is supported on a suitable bed or platform (not shown) with intermediate supporting rollers as may be required.

The carriage 23 and drive means 24

The carriage 23 is positioned so as to be slidable along the moving belt 21. As shown, the carriage 23 has a framework with four corner support pads 33 in contact with the belt 21 and connected to the base of upwardly projecting head end and tail end stanchion members, 34 and 35. The stanchion members 34 and 35 are interconnected by a central member 36 running lengthwise above the belt 21. The belt head roll 26 carries a sprocket 37 for driving a chain 38 engaging a fixed sprocket 39, an adjustable sprocket 40 to maintain the tension of chain 38, and a cable drum sprocket 41. The drum sprocket 41 is connected by a conventional clutch 42 to the drive shaft 43 of a cable drum 44. The cable drum drive shaft 43 and an idler shaft 45 are rotatably carried by bearing blocks 46 mounted on upwardly directed structural members 47. The cable drum 44 carries a length of cable 48 extending above the middle of the belt 21 and having a free end, connected as at 49, to the carriage framework central member 36.

The drive means 24 has an upwardly directed lever arm 50 for actuating the clutch 42 to rotate the cable drum 44 and move the carriage 23, along the belt 21. In the embodiment of the invention which is shown, the clutch lever arm 50 need be actuated, by the user, only to move the carriage 23 toward the rectangular hopper 51, which illustrates the feed supply source.

The rotary diverter assembly 25

Figure 2:
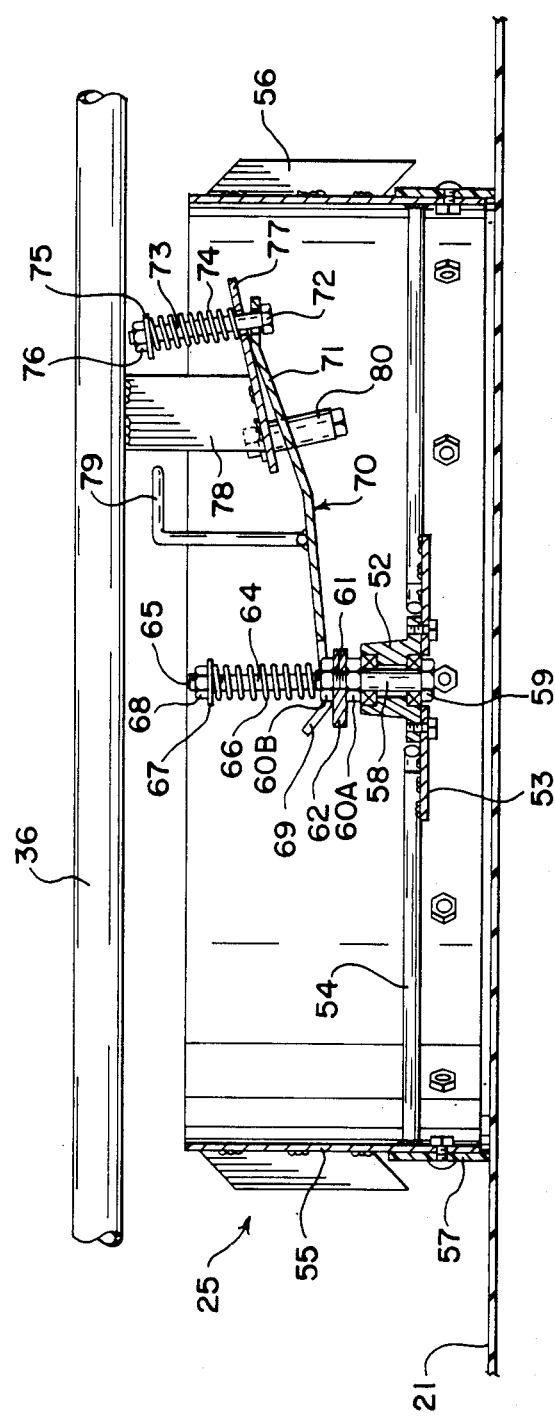
FIG. 2 is a cross-section of a rotary diverter assembly according to the invention.

Referring to FIG. 2, the rotary diverter assembly 25 includes a hub member 52 carrying a radial flange 53. The hub flange 53 has connected thereto the inner ends of a series of radially extending spoke members 54. The outer ends of the spoke members 54 are connected to a rigid annular ring 55. The outer side of the rigid ring 55 carries a series of radially directed feed paddles 56. Below the feed paddles 56, the lower edge of rigid ring 55 carries a resilient annular ring 57 for frictional engagement with the upper surface of a moving belt 21.

The hub member 52 is bearing mounted around an upwardly directed axle shaft 58. The axle shaft 58 is secured within the axial bore of the hub member 52 by a bottom cap head 59 and a medial nut 60A. The axle shaft 58 has an upwardly directed threaded shank 61 for mounting and tightening of the nut 60A. Above the nut 60A, the axle shaft shank 61 projects through a central bore in an axle shaft mounting plate 62. The mounting plate 62 is securely tightened down against the medial nut 60A by an upper nut 60B also mounted on the axle shaft shank 61.

Referring also to FIGS. 3 and 4, the axle shaft mounting plate 62 has dual symmetrical arms 63 projecting laterally from the central hole therein and the axle shaft 58. The terminal portion of each mounting plate arm 63 has a bore for receiving the threaded shank of a cap bolt 64. The upwardly extending threaded shank 65 of each cap bolt 64 carries a coil spring 66. The upper end of each coil spring 66 is engaged by a washer 67. Each washer 67 is adjustably tightened down against a coil spring 66 by an upper nut 68 mounted on a cap bolt shank 65. Below the base end of each coil spring 66, each cap bolt 64 carries a forwardly projecting yoke end 69 of an articulated axle shaft mounting member indicated at 70.

An articulated member 70 for mounting the axle shaft 58 and hub member 52 of a rotary diverter assembly 25 has dual yoke ends 69 so that the user of the apparatus 20 may have access to the hub member for maintenance purposes. The function of the articulated member 70 is to carry the axle shaft mounting plate 62 by a two-point suspension on the dual cap bolts 64 and reactive to the forces exerted against the upper surface of the dual yoke ends 69 by tightened and compressed dual coil springs 66. The relative distance between the cap bolts 64 and away from the hub member 52 has been found to be critical to operation of the rotary diverter assembly 25. The spacing of the cap bolts 64 should be such that the lower edge of a rigid ring 55—resilient ring 57 subassembly is maintained in pressure contact with one side of the moving belt 21 by the action of the coil springs 66.

As best shown in FIG. 2, the medial portion of the axle shaft mounting member 70 may be fabricated, as at 71, to provide a resilient or downwardly reacting component. The terminal end of the mounting member 70 is carried by a cap bolt 72. The upwardly extending threaded shank 73 of the cap bolt 72 carries a coil spring 74. The upper end of the coil spring 74 is engaged by a washer 75. A washer 75 is adjustably tightened down against the coil spring 74 by an upper nut 76 mounted on the cap bolt shank 73. Below the base end of a coil spring 74, the cap bolt 72 carries the medial portion of a feed side position plate, indicated at 77.

One function of the feed side position plate 77 is to carry the articulated member 70, for mounting the axle shaft 58 and hub member 52 of a rotary diverter assembly 25, by a one point suspension on the cap bolt 72 and reactive to a force exerted against the under surface of the mounting member 70 by a tightened and compressed coil spring 74. When the feed delivery apparatus 20 is not designed or dedicated to feed only on one side of the moving belt 21, another function of the feed side position plate 77 is to provide a pivot for the mounting member 70 to enable the user to selectively choose a feed position on either side of the belt 21.

The feed side position plate 77 is carried by a downwardly directed bracket 78 connected to the carriage framework central member 36. The pivotal movement of the mounting member 70, to either side of the belt 21, may be initiated by a laterally directed lever arm 79 connected thereto. The pivotal movement of the mounting member 70, to either side of the belt 21, is limited by dual stop bolts 80 projecting downwardly from the front corners of the position plate 77.

ALTERNATIVE EMBODIMENT

Although not shown, it should be apparent from the above description that the carriage 23 may have a slide plate mounted beneath the endless belt 21. The slide plate may be connected to the base of two upwardly projecting stanchion members, one on each side of the belt 21, and interconnected by a central member running crosswise above the belt 21. Therefore, the scope of the invention should be determined solely by the claims as granted.

What is claimed is:

1. A delivery apparaus for livestock feed comprising: a moving endless belt for carrying feed from a supply source toward feeding positions at either side of said belt, a carriage movable along a substantial portion of said belt and having stanchion members projecting upwardly above said belt and innerconnected by a central member, a drive means for selectively moving said carriage along said belt, and a rotatable diverter assembly suspended from said carriage central member and maintained in pressure contact with said moving belt for discharging feed thereon to a side thereof;

said rotary diverter assembly including a hub member having an upwardly directed axle shaft and adapted for carrying an annular ring in contact with said moving belt, an articulated axle shaft mounting member extended laterally from said carriage central member, and means to position said axle shaft mounting member with said annular ring in pressure contact with one side of said moving belt;

said hub member carrying a rigid annular ring with a series of radially outwardly directed feed paddles thereon, and, below said feed paddles, said rigid ring carries a resilient annular ring for frictional contact with the upper surface of said moving belt.

2. A feed delivery apparatus according to claim 1, wherein, said carriage has a framework with four corner support pads in contact with said belt and connected to the base of upwardly projecting head end and tail end stanchion members, and said carriage drive means is actuated only to move said carriage toward said supply source.

* * * * *